US009539565B2

(12) United States Patent
Naraki et al.

(10) Patent No.: US 9,539,565 B2
(45) Date of Patent: Jan. 10, 2017

(54) β-TYPE IRON SILICATE COMPOSITION AND METHOD FOR REDUCING NITROGEN OXIDES

(75) Inventors: Yusuke Naraki, Shunan (JP); Ko Ariga, Shunan (JP)

(73) Assignee: TOSOH CORPORATION, Shunan-shi, Yamaguchi (JP)

(*) Notice: Subject to any disclaimer, the term of this patent is extended or adjusted under 35 U.S.C. 154(b) by 481 days.

(21) Appl. No.: 14/115,379

(22) PCT Filed: May 17, 2012

(86) PCT No.: PCT/JP2012/062642
§ 371 (c)(1),
(2), (4) Date: Nov. 4, 2013

(87) PCT Pub. No.: WO2012/157700
PCT Pub. Date: Nov. 22, 2012

(65) Prior Publication Data
US 2014/0079611 A1 Mar. 20, 2014

(30) Foreign Application Priority Data
May 17, 2011 (JP) .................. 2011-110063

(51) Int. Cl.
C01B 33/20 (2006.01)
B01J 29/88 (2006.01)
(Continued)

(52) U.S. Cl.
CPC ............ B01J 29/88 (2013.01); B01D 53/9418 (2013.01); B01J 29/40 (2013.01); B01J 29/7007 (2013.01);
(Continued)

(58) Field of Classification Search
CPC .... B01D 53/9418; B01J 29/40; B01J 29/7007; B01J 29/7615; B01J 29/80; B01J 35/002; B01J 35/023; C01B 39/087
(Continued)

(56) References Cited

U.S. PATENT DOCUMENTS 3,308,069 A 3/1967 Wadlinger et al.
3,702,886 A 11/1972 Argauer et al.
(Continued)

FOREIGN PATENT DOCUMENTS

EP 2 072 128 A1 6/2009
EP 2 130 593 A2 12/2009
(Continued)

OTHER PUBLICATIONS

M. Mauvezin, G. Delahay, F. Kiβlich, B. Coq, S. Kieger. "Catalytic reduction of N2O by NH3 in presence of oxygen using Fe-exchanged zeolites" Catalysis Letters, Sep. 1999, vol. 62, Issue 1, pp. 41-44.*
(Continued)

Primary Examiner — Colleen Dunn
Assistant Examiner — Haytham Soliman
(74) Attorney, Agent, or Firm — Sughrue Mion, PLLC

(57) ABSTRACT

The present invention relates to a composition including a β-type iron silicate, which includes all or part of iron in a β-type framework structure, and a solid acidic porous inorganic oxide. The present invention is characterized in that the β-type iron silicate is compounded with the porous inorganic oxide having solid acidic properties so that the solid acidic function derived from aluminum of the β-type iron silicate, is reinforced or complemented by the porous inorganic oxide, the individual particles of which are physically isolated from each other. It is preferred that the fluorine content relative to the dry weight of the β-type iron silicate (Continued)

is 400 ppm or less and the crystal particles of the β-type iron silicate have a truncated square bipyramidal morphology. According to the present invention, a composition that is useful as a high-performance catalyst, adsorbent, or the like, can be provided.

8 Claims, 3 Drawing Sheets

(51) Int. Cl.

| | | |
|---|---|---|
| B01D 53/94 | (2006.01) | |
| B01J 29/76 | (2006.01) | |
| B01J 35/00 | (2006.01) | |
| B01J 29/40 | (2006.01) | |
| B01J 29/80 | (2006.01) | |
| B01J 35/02 | (2006.01) | |
| C01B 39/08 | (2006.01) | |
| B01J 29/08 | (2006.01) | |
| B01J 29/18 | (2006.01) | |
| B01J 29/65 | (2006.01) | |
| B01J 29/70 | (2006.01) | |

(52) U.S. Cl.
CPC ............. *B01J 29/7615* (2013.01); *B01J 29/80* (2013.01); *B01J 35/002* (2013.01); *B01J 35/023* (2013.01); *C01B 39/087* (2013.01); B01D 2251/2062 (2013.01); B01D 2251/2067 (2013.01); B01D 2255/20738 (2013.01); B01D 2255/502 (2013.01); B01D 2258/012 (2013.01); B01D 2258/014 (2013.01); B01J 29/08 (2013.01); B01J 29/18 (2013.01); B01J 29/65 (2013.01); B01J 29/70 (2013.01); B01J 29/7015 (2013.01); B01J 29/7034 (2013.01); B01J 29/7038 (2013.01)

(58) Field of Classification Search
USPC ........................................................ 423/326
See application file for complete search history.

(56) References Cited

U.S. PATENT DOCUMENTS

| | | | |
|---|---|---|---|
| 2008/0083213 A1 | 4/2008 | Tanada et al. | |
| 2009/0155152 A1* | 6/2009 | Naraki | B01D 53/9418 423/239.1 |
| 2010/0254894 A1* | 10/2010 | Wang | C01B 37/02 423/704 |
| 2011/0305613 A1 | 12/2011 | Stiebels et al. | |

FOREIGN PATENT DOCUMENTS

| | | |
|---|---|---|
| JP | 11-228128 A | 8/1999 |
| JP | 2007-76990 A | 3/2007 |
| JP | 2007-330856 A | 12/2007 |
| JP | 2010-70450 A | 4/2010 |
| JP | 2010-536692 A | 12/2010 |
| JP | 2011-5489 A | 1/2011 |
| WO | 2009/023202 A2 | 2/2009 |
| WO | 2010/146156 A1 | 12/2010 |
| WO | 2011/064666 A2 | 6/2011 |
| WO | 2011/078149 A1 | 6/2011 |

OTHER PUBLICATIONS

P. Caullet et al., "Synthesis of zeolite Beta from nonalkaline fluoride aqueous aluminosilicate gels", Zeolites 1992, pp. 240-251, vol. 12.
E. Berrier et al., "Temperature-dependent $N_2O$ decomposition over Fe-ZSM-5: Identification of sites with different activity", Journal of Catalysis 2007, pp. 67-78, vol. 249.
International Search Report for PCT/JP2012/062642 dated Jun. 19, 2012.
Extended Search Report dated Oct. 28, 2014 issued in application No. 12785394.3-1352.
Chen H. Y. et al, "Reduction of NOx over various Fe/zeolite catalysts", Applied Catalysis A: General, Elsevier Science, Amsterdam, NL, vol. 194-195, 2000, pp. 159-168.

* cited by examiner

β-TYPE IRON SILICATE COMPOSITION AND METHOD FOR REDUCING NITROGEN OXIDES

CROSS REFERENCE TO RELATED APPLICATIONS

This application is a National Stage of International Application No. PCT/JP2012/062642 filed May 17, 2012, claiming priority based on Japanese Patent Application No. 2011-110063 filed May 17, 2011, the contents of all of which are incorporated herein by reference in their entirety.

TECHNICAL FIELD

The present invention relates to a β-type iron silicate composition which is useful as a catalyst, an adsorbent, a separation agent, and the like. In more detail, it is a composition, the function of which is enhanced by compounding a β-type iron silicate, which contains all or part of iron in a β-type framework structure, with a porous inorganic oxide having a solid acidic function. Furthermore, the present invention also relates to a nitrogen oxide-reducing catalyst including the composition, and a method of reducing nitrogen oxides using the same.

Priority is claimed on Japanese Patent Application No. 2011-110063, filed May 17, 2011, the content of which is incorporated herein by reference.

BACKGROUND ART

β-type zeolites which are crystalline aluminosilicates are in extensive use as catalysts, adhesives, and the like. The following attempts for compounding them have been made so as to enhance the functions of β-type zeolites.

For example, Patent Document 1 discloses a nitrogen oxide-reducing catalyst composition which uses, as a reducing agent, a hydrocarbon including: a zeolite catalyst which includes a β-type zeolite loading elemental iron, a β-type zeolite loading elemental cerium, and a proton-type MFI zeolite; and a porous inorganic oxide loading one or more types of noble metal elements.

Patent Document 1 discloses as "Effect of the Invention" that this nitrogen oxide-reducing catalyst composition exerts a high performance of reducing and removing nitrogen oxides that are exhausted from various kinds of combustion devices even at low temperatures. Moreover, it is disclosed that it is preferable that the β-type zeolites constituting this nitrogen oxide-reducing catalyst composition have low silica-alumina ratios.

In addition, Patent Document 2 discloses a catalyst composition including a pentasil type zeolite and one or more types of solid acidic cracking promoters.

Patent Document 2 discloses as "Best Mode for Carrying Out the Invention" that the pentasil type zeolite contains a crystal which has a metal tetrahedrally coordinated in the crystal. However, there is no disclosure of a specific investigation in relation to the embodiments regarding such a zeolite structure, nor of such a metal which is tetrahedrally coordinated in the crystal.

PRIOR ART DOCUMENTS

Patent Documents

[Patent Document 1] Japanese Unexamined Patent Application, First Publication No. 2007-330856
[Patent Document 2] Japanese Unexamined Patent Application, First Publication No. 2011-005489

DISCLOSURE OF INVENTION

Problems to be Solved by the Invention

As mentioned above, there has been so far no known composition in which a β-type iron silicate is compounded with a porous inorganic oxide.

It is an object of the present invention to provide: a novel composition obtained by compounding a β-type iron silicate, which contains all or part of iron in a β-type framework structure, with a porous inorganic oxide having a solid acidic function; and a highly durable nitrogen oxide-reducing catalyst including the composition. Another object is to provide a method of reducing nitrogen oxides, which uses the nitrogen oxide-reducing catalyst and which offers a high rate of reducing and removing nitrogen oxides.

Means to Solve the Problems

The inventors of the present invention have addressed the above-mentioned situations and investigated each of a β-type iron silicate and a porous inorganic oxide per se, respectively regarding the relation between the physical properties and the function thereof. As a result, they discovered that both substances were able to exert a synergetic effect in terms of the function. This has led to the discovery of the composition of the present invention, the nitrogen oxide-reducing catalyst including the composition, and the method of reducing nitrogen oxides, which uses the nitrogen oxide-reducing catalyst and which uses ammonia or the like as a reducing agent, and had led to the completion of the present invention.

That is, the present invention is a composition including a β-type iron silicate, which contains all or part of iron in a β-type framework structure, and one or more types of solid acidic porous inorganic oxides.

That is, the present invention relates to the followings:
(1) a composition including a β-type iron silicate, which includes all or part of iron in a β-type framework structure, and a solid acidic porous inorganic oxide;
(2) the composition according to (1), wherein a fluorine content relative to a dry weight of the β-type iron silicate is 400 ppm or less, and crystal particles of the β-type iron silicate have a truncated square bipyramidal morphology;
(3) the composition according to (1) or (2), wherein a $SiO_2/Al_2O_3$ molar ratio of the β-type iron silicate is 300 or more, and an iron content relative to a dry weight of the β-type iron silicate is 5.5% by weight or more and 12% by weight or less;
(4) the composition according to any one of (1) to (3), wherein the porous inorganic oxide is at least one type of porous inorganic oxide selected from the group consisting of a zeolite, an alumina, and a silica-alumina compound or a composite oxide;
(5) the composition according to (4), wherein the zeolite has at least one type of crystalline structure selected from the group consisting of *BEA, FAU, MOR, MFI, FER, LTL, MWW, MTW, CHA, LEV, and SZR;

(6) the composition according to (5), wherein the zeolite is an H-type zeolite;

(7) a nitrogen oxide-reducing catalyst including the composition according to any one of (1) to (6); and (8) a method of reducing nitrogen oxides, including selectively reducing a nitrogen oxide by contacting the nitrogen oxide with at least one type of reducing agent selected from the group consisting of ammonia, urea, and an organic amine, under the presence of the nitrogen oxide-reducing catalyst according to (7).

Effect of the Invention

The present invention is able to provide: a novel composition obtained by compounding a β-type iron silicate, which contains all or part of iron in a β-type framework structure, with a porous inorganic oxide having a solid acidic function; and a highly durable nitrogen oxide-reducing catalyst including the composition.

Moreover, the present invention is able to provide a method of reducing nitrogen oxides, which uses the nitrogen oxide-reducing catalyst and which offers a high rate of reducing and removing nitrogen oxides.

The β-type iron silicate contains iron in a highly dispersed state, because of which it shows a high reducing activity in a wide range of temperature including low temperatures of around 200° C., for example, when used as a nitrogen oxide-reducing catalyst with ammonia as a reducing agent. On the other hand, when the composition of the present invention is used as the above-mentioned catalyst, the activity is much improved at high temperatures of around 500° C. in addition to the high activity of the β-type iron silicate, and the low temperature activity which is remarkably higher than calculated standard performance is exerted, even if the blending ratio of the β-type iron silicate is low. That is, the use of the composition of the present invention as a nitrogen oxide-reducing catalyst enables efficient reduction of nitrogen oxides in a wide range of temperature, and contributes to the design of a high-performance catalyst with a high degree of freedom.

BEST MODE FOR CARRYING OUT THE INVENTION

Figure 1:
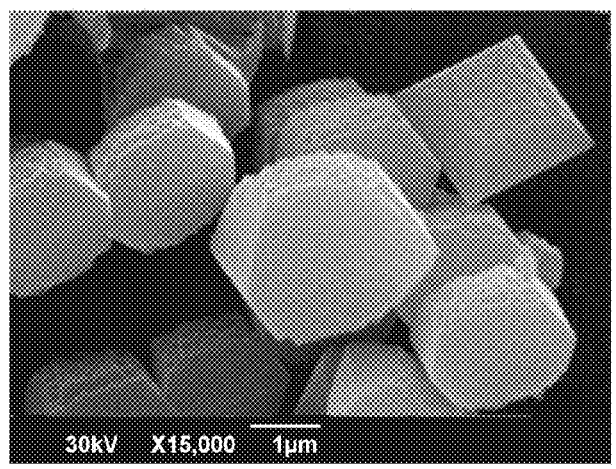
FIG. 1 is a pattern diagram showing the crystalline form of primary particles of a β-type iron silicate of Synthesis Example 1.

Hereunder is a description of the composition of the present invention.

The β-type iron silicate constituting the composition of the present invention is a crystalline silicate, which contains all or part of iron in a β-type framework structure.

Note that, the β-type framework structure means the three dimensional geometry of a β-type crystalline structure.

The β-type iron silicate is a metallosilicate whose crystalline structure is β-type and which has three dimensional micropores in which the micropores of 0.76×0.64 nm and 0.55×0.55 nm constructed from 12-membered oxygen rings are interconnected. The crystalline structure of the β-type iron silicate can be determined by the X-ray diffraction pattern that is characterized as having a lattice spacing d (Angstrom) and a diffraction intensity shown in the following Table 1.

TABLE 1

| X-ray diffraction pattern of β-type iron silicate | |
|---|---|
| Lattice spacing d (Å) | Peak intensity |
| 11.5 ± 0.4 | Medium-strong |
| 7.4 ± 0.2 | Weak |
| 6.6 ± 0.15 | Weak |
| 4.15 ± 0.10 | Weak |
| 3.97 ± 0.10 | Very strong |
| 3.3 ± 0.07 | Weak |
| 3.0 ± 0.07 | Weak |
| 2.05 ± 0.05 | Weak |

The chemical composition of the β-type iron silicate is represented by the following formula.

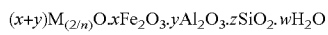

$(x+y)M_{(2/n)}O \cdot xFe_2O_3 \cdot yAl_2O_3 \cdot zSiO_2 \cdot wH_2O$ (wherein: M represents a cation; n represents an atomic value of the cation M; x, y, and z respectively represent mole fractions of $Fe_2O_3$, $Al_2O_3$, and $SiO_2$; and x+y+z=1. w is a number of 0 or more; z/y is not particularly limited but preferably 300 or more; and y may be 0. x and z are numbers greater than 0.)

The range of z/y is preferably 300 or more and 3000 or less, and more preferably 400 or more and 2000 or less.

The β-type iron silicate has a structure in which all or part of iron is linked to oxygen atoms as framework atoms of the tetrahedral coordination structure. For this reason, the β-type iron silicate has solid acidic properties derived from the charge shortage of the silicate framework, similarly to a β-type zeolite which is an aluminosilicate.

The silicate framework denotes a chemical structure of a zeolite formed by the consecution of linkages such as —Si—O—Si—O—.

Generally, the solid acid strength of a silicate varies depending on the type of the metal in the silicate framework. For this reason, β-type iron silicates can be expected to have different adsorbing properties, catalytic properties, and the like, from those of β-type zeolites.

Moreover, iron functions as an active metal in adsorption, catalytic activity, or the like. However, the iron contained in a β-type iron silicate need not always exist in the entire framework constituting the β-type iron silicate. The reason is that some parts of the iron existing in the framework constituting the β-type iron silicate could be detached by a heat treatment such as a calcination process for removing an organic structure directing agent (hereunder, referred to as SDA).

The $SiO_2/Al_2O_3$ molar ratio of the β-type iron silicate of the present invention is not particularly limited, although the $SiO_2/Al_2O_3$ molar ratio is preferably 300 or more, more preferably 400 or more, and even more preferably 500 or more, for the hydrothermal stability.

The range of the $SiO_2/Al_2O_3$ molar ratio is preferably 300 or more and 3000 or less, more preferably 400 or more and 2000 or less, and even more preferably 500 or more and 1500 or less.

The iron content in terms of iron itself relative to the dry weight of the crystal of the β-type iron silicate of the present invention is preferably 5.5% by weight or more and 12% by weight or less.

Here, the dry weight of the crystal is the total sum weight of oxides of all elements constituting the crystal of the β-type iron silicate. Specifically, the dry weight of the crystal means the weight of the crystal of the β-type iron silicate after the crystal has been heat treated in air at 600° C. for 30 minutes.

The range of the iron content relative to the dry weight of the crystal of the β-type iron silicate of the present invention is preferably 5.5% by weight or more in terms of iron itself relative to the dry weight of the crystal because the nitrogen oxide reducing activity is higher, and preferably 12% by weight or less because the β-type structure having good crystallinity can be maintained, more preferably 6% by weight or more and 10% by weight or less, and even more preferably 6.5% by weight or more and 8% by weight or less.

The β-type iron silicate of the present invention has a structure in which all or part of the iron is linked to oxygen atoms as framework atoms of the tetrahedral coordination structure. The iron expressed by the content as mentioned above means all the iron in the β-type iron silicate, contained in both the inside and the outside of the framework of the β-type iron silicate.

The content as mentioned above can be measured by dissolving the β-type iron silicate with an acid, and quantifying the iron content in the dissolved solution by ICP (inductively coupled plasma) optical emission spectrometry.

The fluorine content relative to the dry weight of the crystal of the β-type iron silicate of the present invention is preferably 400 ppm or less.

A β-type iron silicate whose fluorine content relative to the dry weight of the crystal is 400 ppm or less is preferable because there is no negative effect of fluorine on the catalytic performance and the like.

In particular, the fluorine content relative to the dry weight of the crystal of the β-type iron silicate is preferably 200 ppm or less, more preferably 100 ppm or less, and even more preferably its detection limit or less, or it may be 0 ppm.

The β-type iron silicate of the present invention preferably has crystal particles in a truncated square bipyramidal morphology. The morphology of the crystal particles can be observed by a scanning electron microscope.

Generally, the crystal of a hydrothermally synthesized β-type zeolite is easily obtained as an aggregate of irregular spherical or oval spherical primary particles of about 0.1 μm to 1.0 μm. On the other hand, it is known that the primary particles of the crystal of a favorably grown β-type zeolite show a truncated square bipyramidal morphology (for example, refer to "ZEOLITES", Vol. 12 (1992), pp. 240 to 250).

The primary particles of the crystal of the β-type iron silicate of the present invention preferably show a truncated square bipyramidal crystalline morphology when observed by a scanning electron microscope. This is a similar crystalline form to that of the crystal of a favorably grown β-type zeolite. Such a crystalline form shows truncated square bipyramidal morphology which has clear edge lines and lacks the top end.

The aspect ratio of this crystalline form (the ratio of the length of one side constituting the bottom face of the square bipyramidal morphology to the length of the crystal axis orthogonal to the bottom face) may vary depending on synthesis conditions such as the raw material composition, the reaction temperature, the reaction time, and the like.

The crystal particles of the β-type iron silicate may contain twin crystals composed of two or more crystal particles, or may also contain a still-growing crystalline form in some parts.

The iron which exists within the β-type iron silicate framework is considered to be in an isolated state, as well as taking a highly symmetrical tetrahedral structure. On the other hand, the iron which exists outside the β-type iron silicate framework is considered to take an octahedral structure. The above-mentioned iron which exists within the β-type iron silicate framework means iron linking to oxygen atoms as framework atoms of the tetrahedral coordination structure, and the above-mentioned iron which exists outside the β-type iron silicate framework means iron which is not linking to oxygen atoms as framework atoms in the tetrahedral coordination structure. Moreover, the isolated state means a state in which the iron is monomeric, not being in a dimeric, clustering, or aggregating state.

Here, it is known that the paramagnetic iron ions ($Fe^{3+}$) show resonance absorption in an electron spin resonance analysis, and the absorption peaks thereof are attributed to at least three absorption peaks at $g \approx 2.0$, $g \approx 4.3$, and $g > 4.3$ (refer to "Journal of Catalysis", Vol. 249, pp. 67-78 (2007) and others). The absorption peak at $g \approx 2.0$ is attributed to an isolated iron ion having a symmetric tetrahedral structure (or a highly symmetric polycoordination structure). Moreover, the absorption peaks at $g \approx 4.3$ and $g > 4.3$ are respectively attributed to an isolated iron ion having a distorted tetrahedral structure, and a distorted polycoordination structure. From these facts, the existence of iron in the framework of the β-type iron silicate can be confirmed by the absorption peak existing in $g \approx 2.0$ in the electron spin resonance analysis or the existence of a resonance absorption such as an absorption shoulder.

Moreover, the existence of iron in the framework of the β-type iron silicate can also be confirmed by analyzing the X-ray absorption spectrum (XAFS) of the β-type iron silicate. In this case, a fine peak appearing at the absorption edge of the X-ray absorption spectrum which appears in front of the K absorption edge of Fe, a so-called pre-edge peak (7110 eV), is attributed to an isolated iron ion of the tetrahedral structure.

The porous inorganic oxide constituting the composition of the present invention is a porous inorganic oxide having solid acidic properties (hereunder, simply referred to as "porous inorganic oxide"). The solid acid amount and the solid acid strength of the porous inorganic oxide can be arbitrarily selected according to the purposed reaction, the substance to be adsorbed, and the like. For this reason, the porous inorganic oxide can be arbitrarily selected according to the purpose.

The specific surface area of the porous inorganic oxide is preferably 100 m²/g or more. The range of the above-mentioned specific surface area is preferably 100 to 1000 m²/g, and more preferably 150 to 800 m²/g, from the aspect of the adsorption site function or the active site function.

The porous inorganic oxide is preferably at least one type of porous inorganic oxide selected from the group consisting of an alumina, a zeolite, and a silica-alumina compound or a composite oxide, and is more preferably a zeolite.

The above-mentioned alumina (excluding alumina constituting the above-mentioned silica-alumina compound or composite oxide) is preferably an active alumina. The active alumina can be exemplified by γ-alumina.

The crystalline structure of the above-mentioned zeolite can be arbitrarily selected. The zeolite is preferably a zeolite having at least one type of crystalline structure selected from the group consisting of *BEA, FAU, MOR, MFI, FER, LTL, MWW, MTW, CHA, LEV, and SZR, and is more preferably a zeolite having a *BEA or MFI structure, from the aspects of the micropore structure, the hydrothermal stability, the solid acidic properties, and the like.

The cation type of the above-mentioned zeolite is preferably an H-type in order to exert the solid acidic properties. However, the above-mentioned zeolite may also be a zeolite which contains an alkali metal, an alkaline earth metal, a transition metal, a rare earth metal, or the like, in the crystal.

The composition of the present invention includes a β-type iron silicate and a porous inorganic oxide. Because of this, the function and the hydrothermal stability of the composition are improved to be higher than the cases of each of these substances alone. The detailed reason for this is not clear. However, one of the reasons can be thought to be that the porous inorganic oxide, the individual particles of which are physically isolated from each other, may reinforce or complement the solid acidic function derived from aluminum of the β-type iron silicate. That is, when the value of the $SiO_2/Al_2O_3$ molar ratio of the β-type iron silicate is small, the aluminum-derived solid acid exists, and therefore, the function is improved by being "reinforced" by the solid acid of the porous inorganic oxide. When the $SiO_2/Al_2O_3$ molar ratio of the β-type iron silicate is very large, the aluminum is substantially 0 and the aluminum-derived solid acid is 0. Therefore, the function is improved by being "complemented" by the solid acid of the porous inorganic oxide.

In addition, when the $SiO_2/Al_2O_3$ molar ratio of the β-type iron silicate is large, not only the function is "complemented" and improved by the solid acid of the porous inorganic oxide, but also the stability of the β-type iron silicate is improved.

The blending ratio of the β-type iron silicate to the porous inorganic oxide in the composition of the present invention can be arbitrarily set according to the purposed reaction, the substance to be adsorbed, and the like. The blending ratio of the porous inorganic oxide in the composition of the present invention is preferably 5% by weight or more, and more preferably 10% by weight or more, relative to the dry weight of the entire composition of the present invention. In addition, if the blending ratio is preferably 95% by weight or less, and more preferably 60% by weight or less, the composition of the present invention is able to have a high reducing and removing property.

The range of the blending ratio of the porous inorganic oxide in the composition of the present invention is preferably 5% by weight or more and 95% by weight or less, more preferably 10% by weight or more and 90% by weight or less, and even more preferably 10% by weight or more and 60% by weight or less, relative to the dry weight of the entire composition of the present invention.

Next is a description of a method of producing the composition of the present invention.

The method of producing the composition of the present invention is not particularly limited as long as the β-type iron silicate and the porous inorganic oxide are compounded. The above-mentioned term "compounded" means a well-mixed state.

The method of producing the β-type iron silicate to be contained in the composition of the present invention is not particularly limited. In the production method of the present invention, it is preferable to use a β-type iron silicate obtained by a usual production method, for example, a β-type iron silicate that is produced by introducing iron into a zeolite having a β-type zeolite framework through an after treatment, or a β-type iron silicate that is hydrothermally synthesized from an iron-containing raw material.

As the method of producing the β-type iron silicate by introducing iron into a β-type zeolite framework, which is an aluminosilicate, through an after treatment, it is possible to adopt; a method in which an aqueous slurry containing a β-type zeolite and an iron salt is hydrothermally treated, or a liquid-phase treatment method including a method of changing the pH of the aqueous slurry, a gas-phase treatment method in which a zeolite having a β-type framework is contacted with an iron-containing carrier gas, or the like.

When a β-type iron silicate is hydrothermally synthesized from an iron-containing raw material, it is possible to use a silicon source, an iron source, an SDA, an alkali metal source, and water, and, if desired, an aluminum source, as a raw material mixture. Moreover, the preparation composition can be arbitrarily set according to the synthesis formula.

These raw materials are preferably able to be sufficiently homogenously mixed with other ingredients.

As the silicon source, it is possible to use a colloidal silica, an amorphous silica, sodium silicate, tetraethyl orthosilicate, an iron silicate gel, or the like.

As the iron source, it is possible to use iron nitrate, iron chloride, iron sulfate, metal iron, or the like.

The SDA is a substance to be added at the time of synthesis in order to render a zeolite and an iron silicate to be in a specific crystalline structure.

As the SDA of the present invention, it is possible to use at least one type of compound selected from the group consisting of compounds having a tetraethylammonium cation, such as tetraethylammonium hydroxide, tetraethylammonium bromide, and furthermore, octamethylenebisquinuclidium, α,α'-diquinuclidium-p-xylene, α,α'-diquinuclidium-m-xylene, α,α'-diquinuclidium-o-xylene, 1,4-diazabicyclo[2,2,2]octane, 1,3,3,N,N-pentamethyl-6-azoniumbicyclo[3,2,1]octane, or N,N-diethyl-1,3,3-trimethyl-6-azoniumbicyclo[3,2,1]octane cation.

As the alkali metal source, it is possible to use sodium hydroxide, sodium sulfate, sodium chloride, sodium acetate, potassium hydroxide, potassium sulfate, potassium chloride, potassium acetate, or the like.

As the aluminum source, it is possible to use aluminum sulfate, sodium aluminate, aluminum hydroxide, aluminum nitrate, an aluminosilicate gel, metal aluminum, or the like.

In the production method of the present invention, it is more preferable that the β-type iron silicate is produced from a raw material mixture having the following preparation composition.

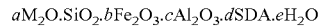

$$aM_2O.SiO_2.bFe_2O_3.cAl_2O_3.dSDA.eH_2O$$

wherein
M=Na⁺ or K⁺,
a=0.075 to 0.50, and preferably 0.10 to 0.25, b=0.01 to 0.05, and preferably 0.01 to 0.03,
c=0.01 or less, preferably 0.003 or less, more preferably 0.002 or less, and may be 0,
d=0.10 to 0.35, and preferably 0.10 to 0.30, and
e=7 to 15, and preferably 9 to 13.

Moreover, an ingredient having a function of promoting the crystallization, such as a seed crystal, may be added.

Because $M_2O$ raises the pH of the raw material mixture, $M_2O$ promotes the dissolution of the iron-containing raw material and the crystallization of the β-type iron silicate. Furthermore, $M_2O$ promotes the dissolution of silicon and increases the ratio of iron introduced into the crystal of the produced β-type iron silicate.

In a favorable preparation composition of the raw material mixture of the β-type iron silicate in the present invention, the ratio of $M_2O$ to $H_2O$ (a/e) is preferably 0.008 or more, more preferably 0.009 or more, and even more preferably 0.010 or more. As the ratio of $M_2O$ becomes higher, the pH of the raw material mixture is increased to promote the dissolution of the iron-containing raw material and the crystallization of the β-type iron silicate.

In a favorable preparation composition of the raw material mixture of the β-type iron silicate in the present invention, the amount of aluminum is preferably as small as possible. However, aluminum is brought therein in a form of impurity of the raw material. For this reason, it is preferable to use a raw material which contains as small amount of aluminum as possible for constituting the raw material mixture. Therefore, the above-mentioned c value is preferably small, meaning that the c value should be 0.01 or less, preferably 0.003 or less, and even more preferably 0.002 or less, and may be 0.

Fluorine may also be used for the raw material composition to synthesize the β-type iron silicate. However, if fluorine is used for the synthesis, the fluorine would easily remain therein even after the calcination for removing the SDA. Because of this, the catalytic performance and the like may be negatively affected. For this reason, it is preferable to synthesize the β-type iron silicate without using fluorine for the raw material composition.

The β-type iron silicate can be crystallized by treating the raw material mixture containing a silicon source, an iron source, an SDA, an alkali metal source, and water, and if desired an aluminum source, in a closed pressure vessel at a temperature of 100° C. to 180° C.

At the time of the crystallization, the raw material mixture may be in a mixed state under stirring, or in a static state. Upon the completion of the crystallization, the product is left to stand to be thoroughly cooled down, is subjected to a solid-liquid separation, and washed with a sufficient amount of water, and then dried at a temperature of 110° C. to 150° C. By so doing, the β-type iron silicate is obtained.

Because the dried β-type iron silicate contains an SDA, the SDA may be removed. For the removal treatment of the SDA, it is possible to use a liquid phase treatment using an acid solution or a solution containing an SDA decomposing component, an exchange treatment using a resin or the like, or a thermal decomposition treatment. Moreover, these treatments may also be combined.

Furthermore, it is also possible to convert the cation of the β-type iron silicate into an H-type or an $NH_4$-type by utilizing the ion-exchanging property of the β-type iron silicate.

The method to convert the cation of the β-type iron silicate into an H-type or an $NH_4$-type can be exemplified by immersing the β-type iron silicate in an acid or an ammonia water to effect ion exchange.

A more active metal species may also be loaded on the β-type iron silicate. The metal species to be loaded are not particularly limited, although preferred are one or more types of metal species selected from the group consisting of iron, cobalt, palladium, iridium, platinum, copper, silver, and gold.

As the method of loading the metal, it is possible to use a method such as an ion-exchange method, an impregnation loading method, an evaporation drying method, a precipitation loading method, a physical mixing method, or the like. Regarding the raw material for use in the metal loading, it is possible to use a nitrate salt, a sulfate salt, an acetate salt, a chloride, a complex salt, an oxide, a composite oxide, or the like.

The amount of metal to be loaded is not limited, although it is preferably within a range of 0.1% by weight to 10% by weight relative to the dry weight of the crystal.

Regarding the porous inorganic oxide constituting the composition of the present invention, it is possible to use a product synthesized in accordance with the literature information or the like, or a commercially available product.

If a zeolite is used as the porous inorganic oxide, the zeolite can be synthesized in accordance with a synthesis method in the literature information or the like, which is disclosed, for example, by the website of the International Zeolite Association (www.iza-online.org).

The literature disclosing the synthesis method of zeolite can be exemplified by U.S. Pat. No. 3,702,886, U.S. Pat. No. 3,308,069, or the like.

The composition of the present invention is preferably compounded by mixing the β-type iron silicate and the porous inorganic oxide.

The method of compounding the β-type iron silicate and the porous inorganic oxide by mixing is not limited as long as both substances can be well mixed. The compounding method can be exemplified by: dry blending, wet blending, or kneading and mixing, by means of a mixer, a blender, or the like; a method of mixing both substances in a slurry state and drying the same by a spray dryer; or the like.

If the porous inorganic oxide of the present invention is a zeolite, and if the β-type iron silicate or the zeolite contains an SDA, they can be compounded after removing the SDA. Besides, both substances may also be compounded by mixing in a state where the β-type iron silicate or the zeolite contains the SDA, and thereafter removing the SDA by an operation such as calcination.

If the porous inorganic oxide of the present invention is a substance other than zeolite, and if the β-type iron silicate contains an SDA, they can be compounded after removing the SDA of the β-type iron silicate. Besides, both substances may also be compounded by mixing in a state where the β-type iron silicate contains the SDA, and thereafter removing the SDA by an operation such as calcination.

The blending ratio of the porous inorganic oxide to the β-type iron silicate can be arbitrarily set according to the purposed reaction, the substance to be adsorbed, and the like. The blending ratio of the porous inorganic oxide in the composition of the present invention is preferably 5% by weight or more and 95% by weight or less, and more preferably 10% by weight or more and 60% by weight or less, relative to the dry weight of the entire composition of the present invention.

The composition of the present invention can be used as a nitrogen oxide-reducing catalyst.

That is, another aspect of the present invention relates to a use of the above-mentioned composition as a nitrogen oxide-reducing catalyst. Yet another aspect of the present invention relates to the above-mentioned composition for use as a nitrogen oxide-reducing catalyst.

The composition of the present invention contains iron serving as an active metal. For this reason, the composition per se is able to be used as a nitrogen oxide-reducing catalyst. However, a more active metal species may also be loaded on the composition of the present invention for use as a nitrogen oxide-reducing catalyst.

The metal species to be loaded are not particularly limited. For example, elements of the groups-VIII, IX, X, or XI of the periodic table can be enumerated. The metal species to be loaded are preferably one or more types of metal species selected from the group consisting of iron, cobalt, palladium, iridium, platinum, copper, silver, and gold, and more preferably one or more types of metal species selected from the group consisting of iron, palladium, platinum, copper, and silver.

The method of loading an active metal species, if loaded, is not particularly limited. As the loading method, it is possible to adopt a method such as an ion-exchange method, an impregnation loading method, an evaporation drying method, a precipitation loading method, a physical mixing method, or the like. Regarding the raw material for use in the metal loading, preferred are a nitrate salt, a sulfate salt, an acetate salt, a chloride, a complex salt, an oxide, a composite oxide, or the like, of the metal species to be loaded.

The amount of the metal species to be loaded is not limited, although it is preferably within a range of 0.1% by weight to 10% by weight relative to the dry weight of the composition.

Moreover, a promoter ingredient such as a rare earth metal, titanium, zirconia, or the like, may be additionally used.

The form of the composition of the present invention is not particularly limited, if it is used as a nitrogen oxide-reducing catalyst.

The composition of the present invention can also be additionally mixed with a binder such as a silica, an alumina, a clay mineral, and the like, and molded for use as a molded product. The clay mineral for use in the molding can be exemplified by kaoline, atapulgite, montmorillonite, bentonite, allophane, or sepiolite.

The method of producing the above-mentioned molded product can be exemplified by a method of adding 10 to 30 parts by weight of a binder and an appropriate amount of water to 100 parts by weight of the β-type iron silicate, and molding the same in a spherical shape having a diameter of about 2 mm by using an extruder.

In addition, the composition may also be used after wash coating over a honeycomb base material made of cordierite or metal.

A first embodiment of the present invention can be exemplified by a composition including a β-type iron silicate, which contains all or part of iron in a β-type framework structure, and one or more types of solid acidic porous inorganic oxides, wherein: the fluorine content relative to the dry weight of the β-type iron silicate is 100 ppm or less; the crystal particles of the γ-type iron silicate have a truncated square bipyramidal morphology; the $SiO_2/Al_2O_3$ molar ratio of the β-type iron silicate is 500 or more and 1500 or less; the iron content relative to the dry weight of the β-type iron silicate is 6.5% by weight or more and 8% by weight or less; the porous inorganic oxide is an H-type zeolite having a *BEA structure, an H-type zeolite having an MFI structure, or a γ-alumina; and the blending ratio of the porous inorganic oxide in the composition is 10% by weight or more and 90% by weight or less relative to the dry weight of the entire composition.

By using the composition of the present invention as a nitrogen oxide-reducing catalyst, and by contacting a nitrogen oxide with at least one type of reducing agent selected from the group consisting of ammonia, urea, and an organic amine under the presence of the composition of the present invention, the nitrogen oxide in an exhaust gas exhausted from a diesel engine or the like can be selectively reduced.

The reducing agent is preferably ammonia or urea.

A second embodiment of the present invention can be exemplified by a nitrogen oxide-reducing catalyst, which includes the above-mentioned composition of the first embodiment on which one or more types of metal species selected from the group consisting of iron, palladium, platinum, copper, and silver, are loaded, wherein the amount of the metal species loaded thereon is 0.1% by weight to 10% by weight relative to the dry weight of the composition.

A third embodiment of the present invention can be exemplified by a method of reducing nitrogen oxides including selectively reducing a nitrogen oxide by contacting the nitrogen oxide with a reducing agent, particularly preferably a gaseous reducing agent, under the presence of the above-mentioned composition of the first embodiment.

The nitrogen oxide to be reduced by the present invention can be exemplified by nitrogen monoxide, nitrogen dioxide, dinitrogen trioxide, dinitrogen tetraoxide, dinitrogen monoxide, and a mixture thereof. Preferred are nitrogen monoxide, nitrogen dioxide, dinitrogen monoxide, and a mixture thereof, and more preferred are nitrogen monoxide, nitrogen dioxide, and a mixture thereof. Here, the nitrogen oxide concentration of the exhaust gas that can be treated by the present invention is not to be limited.

The method of adding the reducing agent is not particularly limited, and it is possible to adopt: a method of directly adding a reducing component in a gas state; a method of evaporating a liquid such as an aqueous solution by atomization; or a method of thermally decomposing a liquid by atomization. The amount of adding such a reducing agent can be arbitrarily set so that nitrogen oxides can be sufficiently reduced.

Moreover, the exhaust gas may also contain components other than nitrogen oxides. For example, hydrocarbons, carbon monoxide, carbon dioxide, hydrogen, nitrogen, oxygen, sulfur oxides, or water may be contained in the exhaust gas. Specifically, the method of the present invention is capable of reducing nitrogen oxides contained in various kinds of exhaust gases such as those from diesel cars, gasoline automobiles, boilers, gas turbines, or the like.

When an exhaust gas comes in contact with the nitrogen oxide-reducing catalyst including the composition of the present invention, in the method of reducing nitrogen oxides of the present invention, the space velocity is not particularly limited. Preferred is 500 to 500,000 $hr^{-1}$, and more preferably 2,000 to 300,000 $hr^{-1}$, in terms of volume.

EXAMPLES

Hereunder is a description of the present invention with reference to Examples. However, the present invention is not to be limited to these Examples.

(Electron Spin Resonance Analysis)

The electron spin resonance apparatus ("JES-TE200" manufactured by JEOL Ltd.) was used for the measurement apparatus. The measurement conditions were set to be such that the measurement temperature was 77° K, the microwave output was 1.0 mW, the measurement range was 0 to 1,000 mT, the modulation amplitude was 0.32 mT, and the time constant was 0.3 sec.

The measurement was carried out by weighing out about 10 mg of a sample in a quartz sample tube, and inserting the sample tube into a dewar vessel for the measurement of the liquid nitrogen temperature.

(Method of Measuring the Fluorine Content in the Crystal)

The fluorine content in the β-type iron silicate was quantified by lanthanum alizarin complexone absorption photometry. A commercially available "Alfusone" (Dojindo Laboratories) was used as a lanthanum alizarin complexone.

As a pretreatment for the analysis, samples were dissolved in alkali, concentrated, distilled, then added with Alfusone, and adjusted for the pH, before measuring the absorbance at a wavelength of 620 nm.

(Method of the Reduction Test)

Samples were press-molded and then pulverized and granulated to have a particle size of 12 to 20 meshes. 1.5 cc of the granulated sample powder was filled in an atmospheric pressure fixed bed flow reaction tube. While a gas having the composition shown in Table 2 below was passed through the catalyst layer at a flow rate of 1,500 cc/min, the constant ratio of reducing nitrogen oxides was measured at 200° C. or 500° C.

TABLE 2

Gas composition in a catalytic reaction test

| Gas | Concentration |
| --- | --- |
| NO | 200 ppm |
| $NH_3$ | 200 ppm |
| $O_2$ | 10 vol % |
| $H_2O$ | 3 vol % |
| $N_2$ | Balance |

The rate of reducing and removing nitrogen oxides was obtained by the following formula.

$$X_{NOx} = \{([NOx]_{in} - [NOx]_{out})/[NOx]_{in}\} \times 100$$

wherein $X_{NOx}$ is a ratio of reducing nitrogen oxides, $[NOx]_{in}$ is a concentration of nitrogen oxides in an inflow gas (gas flowing into the reaction tube), and $[NOx]_{out}$ is a concentration of nitrogen oxides in an outflow gas (gas flowing out from the reaction tube).

In the present invention, the state of the composition after being produced was regarded as a fresh state (a state before the durability treatment). Moreover, 3 cc of the composition was treated by filling in an atmospheric pressure fixed bed flow reaction tube, and passing air containing 10% by volume of $H_2O$ therethrough at a flow rate of 300 cc/min at 700° C. for 20 hours (durability treatment). The state of the thus obtained composition was regarded as a durability treated state. The ratio of reducing nitrogen oxides was measured for both the compositions in the fresh state and the durability treated state.

Synthesis Example 1

Synthesis of β-Type Iron Silicate

Predetermined amounts of #3 sodium silicate ($SiO_2$; 30%, $Na_2O$; 9.1%, $Al_2O_3$; 0.01%, and water as a balance), 98% sulfuric acid, water, and ferric nitrate noahydrates were mixed together, by which a gel was produced. The produced gel was subjected to solid-liquid separation and then washed with pure water.

Predetermined amounts of water, 35% tetraethylammonium hydroxide (hereunder, referred to as "TEAOH"), and 48% NaOH were added to the washed gel and thoroughly mixed under stirring, by which a reaction mixture was obtained.

The composition ratio of the reaction mixture was $SiO_2$: $0.015Fe_2O_3$:$0.00046Al_2O_3$:$0.20Na_2O$:$0.15TEAOH$:$10H_2O$.

This reaction mixture was sealed in a stainless steel autoclave and heated under rotation at 150° C. for 90 hours to thereby crystallize the β-type iron silicate. The color of the crystallized β-type iron silicate was white.

The fluorine content relative to the dry weight of the obtained crystal of the β-type iron silicate was below the quantitation limit of analysis: 100 ppm, being equal to or lower than the detection limit.

The β-type iron silicate was subjected to X-ray diffraction analysis. The X-ray diffraction chart of the obtained β-type iron silicate had diffraction peaks in the positions shown in the above-mentioned Table 1.

In addition, as a result of an analysis by inductively coupled plasma-optical emission spectrophotometry, the β-type iron silicate contained iron at 6.7% by weight relative to the dry weight of the crystal, and had a $SiO_2/Al_2O_3$ molar ratio of 860.

The observation result of the crystal particles of the obtained β-type iron silicate by the scanning electron microscope is shown in FIG. 1. The primary particles of the crystal had a form of a favorably grown crystal having a truncated square bipyramidal morphology with clear edge lines.

Moreover, the obtained β-type iron silicate was subjected to an electron spin resonance analysis.

Figure 2:
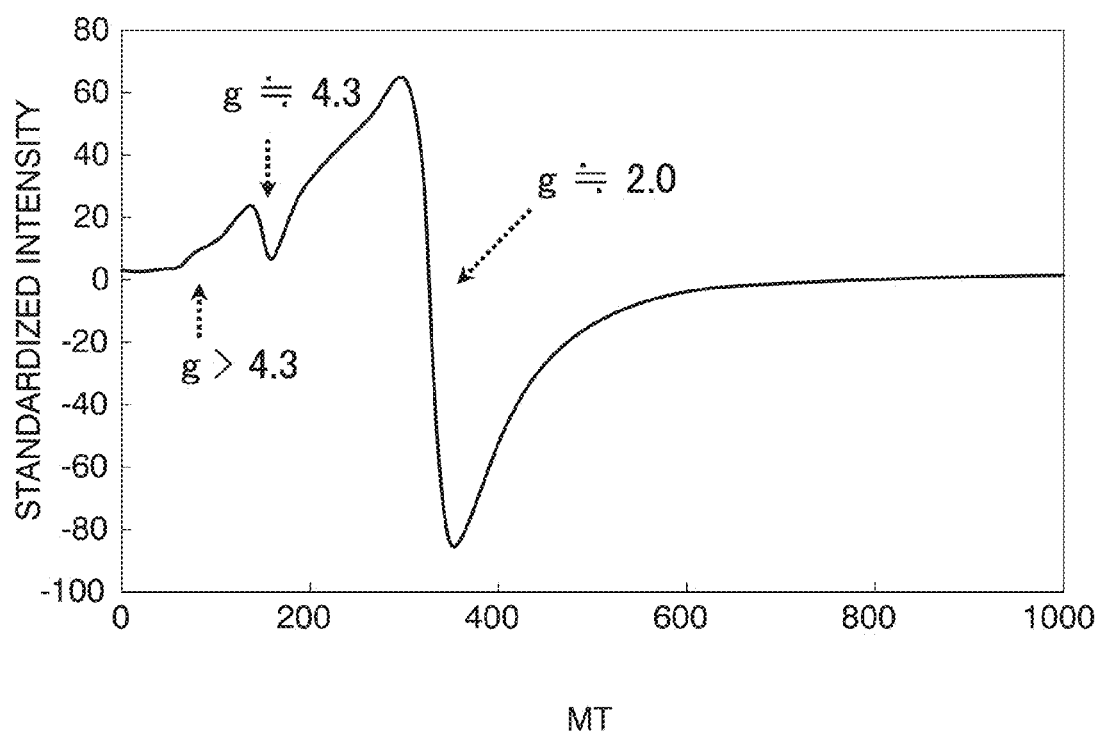
FIG. 2 shows an electron spin resonance spectrum of the β-type iron silicate obtained in Synthesis Example 1.

The spectrum resulting from the analysis of the obtained β-type iron silicate is shown in FIG. 2. In the resulting spectrum, a large resonance absorption peak at g≈2.0 was observed. From this result, the existence of an isolated iron ion having a symmetric tetrahedral structure existing in the β-type iron silicate framework was confirmed.

On the other hand, the absorption at g≤4.3 and g>4.3 was small. From this result, it was elucidated that the β-type iron silicate of Synthesis Example 1 had a small amount of an isolated iron ion having a distorted tetrahedral structure and a distorted polycoordination structure.

Example 1

The β-type iron silicate obtained in Synthesis Example 1 was calcined at 600° C. to remove SDA. The β-type iron silicate after the removal of SDA, and a β-type zeolite having a $SiO_2/Al_2O_3$ molar ratio of 28 (crystalline structure: *BEA structure, H-type) were weighed out. These were thoroughly mixed using a mortar, by which a composition was obtained.

The composition was prepared so that the blending ratio of the β-type zeolite in the composition would be respectively 10% by weight, 20% by weight, 30% by weight, 40% by weight, 50% by weight, 70% by weight, and 90% by weight, relative to the dry weight of the entire composition, by which seven types of compositions were obtained.

Example 2

The β-type iron silicate obtained in Synthesis Example 1 was calcined at 600° C. to remove SDA. The β-type iron silicate after the removal of SDA, and a commercially available γ-alumina (manufactured by STREM CHEMICALS, INC) were weighed out. These were thoroughly mixed using a mortar, by which a composition was obtained.

The composition was prepared so that the blending ratio of the γ-alumina in the composition would be 20% by weight relative to the dry weight of the entire composition.

Example 3

The β-type iron silicate obtained in Synthesis Example 1 was calcined at 600° C. to remove SDA. The β-type iron silicate after the removal of SDA, and a ZSM-5 type zeolite having a $SiO_2/Al_2O_3$ molar ratio of 28 (crystalline structure: MFI structure, H-type) were weighed out. These were thoroughly mixed using a mortar, by which the composition was obtained.

The composition was prepared so that the blending ratio of the ZSM-5 type zeolite in the composition would be 20% by weight relative to the dry weight of the entire composition.

(Reduction Test of Nitrogen Oxides)

Each of the β-type iron silicate and the β-type zeolite used in Example 1 and the compositions obtained in Examples 1 to Example 3 were subjected to the reduction test of nitrogen oxides.

Figure 3:
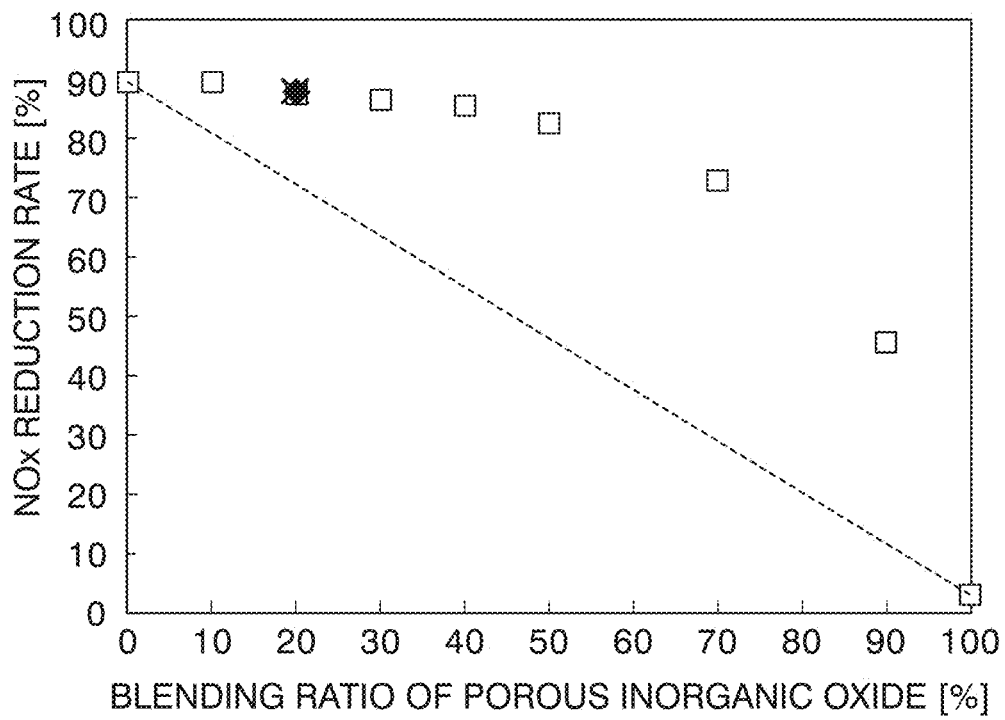
FIG. 3 shows the relation between the blending ratio of the β-type zeolite, the γ-alumina, or the ZSM-5 type zeolite in the compositions obtained in Examples 1 to 3, and the nitrogen oxide reduction rate in a fresh state at 200° C.

The relation between the blending ratio of the β-type zeolite constituting the composition of Example 1 and the nitrogen oxide reduction rate in a fresh state at 200° C. is shown in FIG. 3. Based on the nitrogen oxide reduction rates measured for each of the β-type iron silicate and the β-type zeolite alone, the calculated relation between the post mixing β-type zeolite content and the nitrogen oxide reduction rate is shown by a dotted line in FIG. 3.

The composition of Example 1 showed almost no difference in the nitrogen oxide reduction rate as compared to the β-type iron silicate (having the blending ratio of the β-type zeolite=0% by weight) up to 10% by weight to 30% by weight of the blending ratio of the β-type zeolite, and nitrogen oxide reduction rates exceeding the dotted line of FIG. 3 in any measurement.

The relation between the blending ratio of the γ-alumina constituting the composition of Example 2 and the nitrogen oxide reduction rate in a fresh state at 200° C. is shown in FIG. 3. The composition of Example 2 showed a similar nitrogen oxide reduction rate to that of the composition of Example 1 having the same blending ratio (20% by weight).

The relation between the blending ratio of the ZSM-5 type zeolite constituting the composition of Example 3 and the nitrogen oxide reduction rate in a fresh state at 200° C. is shown in FIG. 3. The composition of Example 3 showed a similar nitrogen oxide reduction rate to that of the composition of Example 1 having the same blending ratio (20% by weight).

Figure 4:
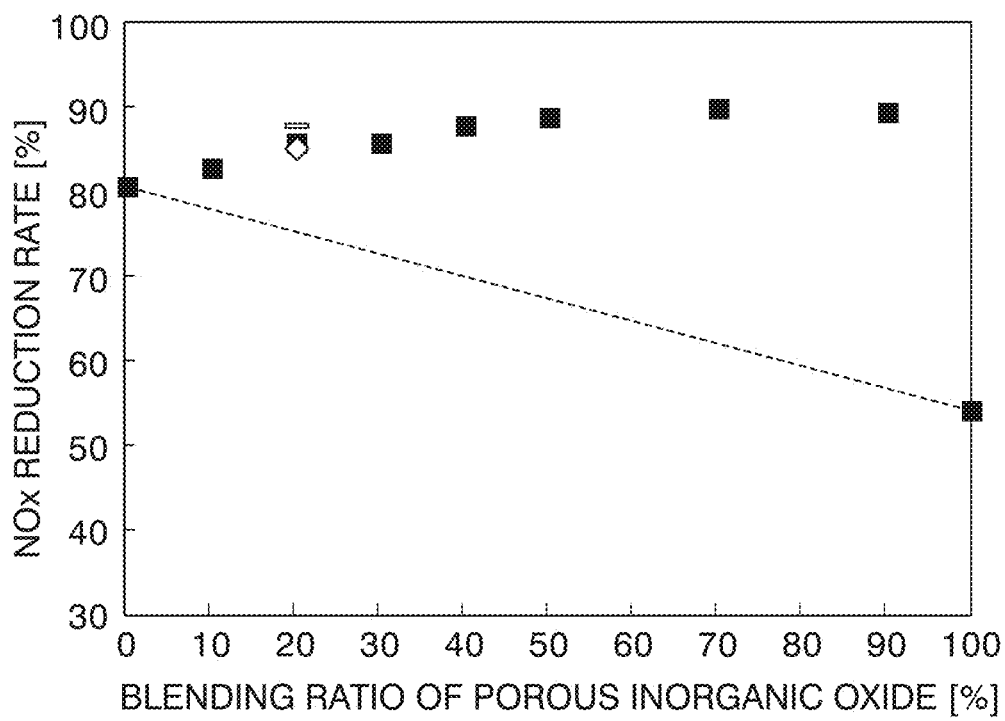
FIG. 4 shows the relation between the blending ratio of the β-type zeolite, the γ-alumina, or the ZSM-5 type zeolite in the compositions obtained in Examples 1 to 3, and the nitrogen oxide reduction rate in a fresh state at 500° C.

The relation between the blending ratio of the β-type zeolite constituting the composition of Example 1 and the nitrogen oxide reduction rate in a fresh state at 500° C. is shown in FIG. 4. The nitrogen oxide reduction rate of the composition of Example 1 was increased along with the increase of the blending ratio of the β-type zeolite.

The relation between the blending ratio of the γ-alumina constituting the composition of Example 2 and the nitrogen oxide reduction rate in a fresh state at 500° C. is shown in FIG. 4. The composition of Example 2 showed a similar nitrogen oxide reduction rate to that of the composition of Example 1 having the same blending ratio (20% by weight).

The relation between the blending ratio of the ZSM-5 type zeolite constituting the composition of Example 3 and the nitrogen oxide reduction rate in a fresh state at 500° C. is shown in FIG. 4. The composition of Example 3 showed a similar nitrogen oxide reduction rate to that of the composition of Example 1 having the same blending ratio (20% by weight).

Figure 5:
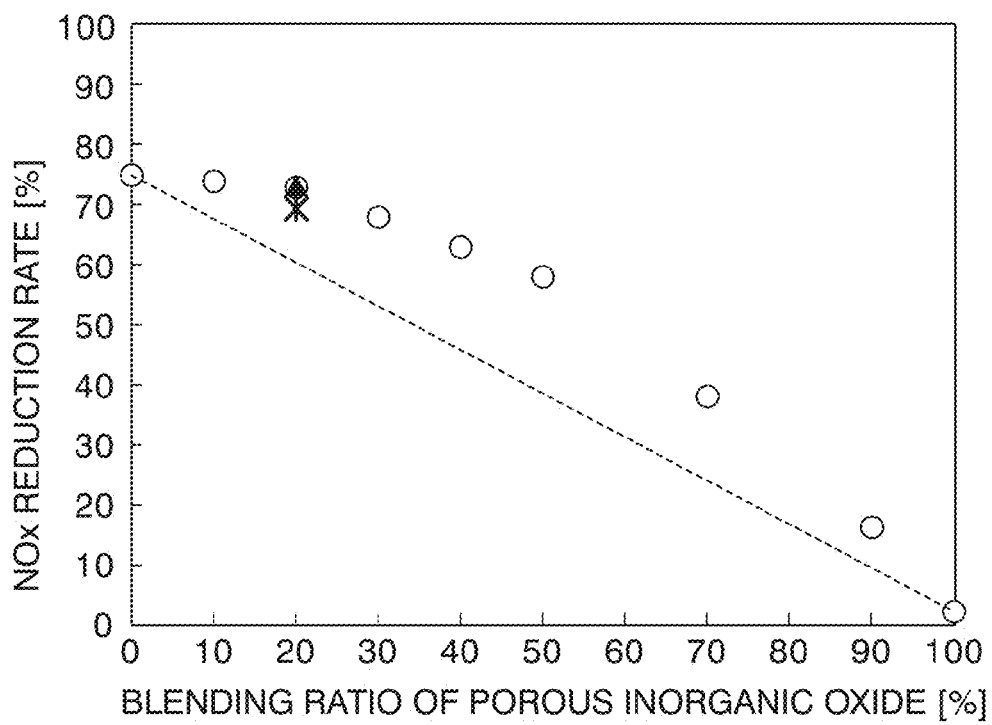
FIG. 5 shows the relation between the blending ratio of the β-type zeolite, the γ-alumina, or the ZSM-5 type zeolite in the compositions obtained in Examples 1 to 3, and the nitrogen oxide reduction rate in a durability treated state at 200° C.

The relation between the blending ratio of the β-type zeolite constituting the composition of Example 1 and the nitrogen oxide reduction rate in a durability treated state at 200° C. is shown in FIG. 5. Based on the nitrogen oxide reduction rates measured for each of the β-type iron silicate and the β-type zeolite alone, the calculated relation between the post mixing β-type zeolite content and the nitrogen oxide reduction rate is shown by a dotted line in FIG. 5. The composition of Example 1 showed almost no difference in the nitrogen oxide reduction rate as compared to the β-type iron silicate (having the blending ratio of the β-type zeolite=0% by weight) up to 10% by weight to 20% by weight of the blending ratio of the β-type zeolite, and nitrogen oxide reduction rates exceeding the dotted line of FIG. 5 in any measurement.

The relation between the blending ratio of the γ-alumina constituting the composition of Example 2 and the nitrogen oxide reduction rate in a durability treated state at 200° C. is shown in FIG. 5. The composition of Example 2 showed a similar nitrogen oxide reduction rate to that of the composition of Example 1 having the same blending ratio (20% by weight).

The relation between the blending ratio of the ZSM-5 type zeolite constituting the composition of Example 3 and the nitrogen oxide reduction rate in a durability treated state at 200° C. is shown in FIG. 5. The composition of Example 3 showed a similar nitrogen oxide reduction rate to that of the composition of Example 1 having the same blending ratio (20% by weight).

Figure 6:
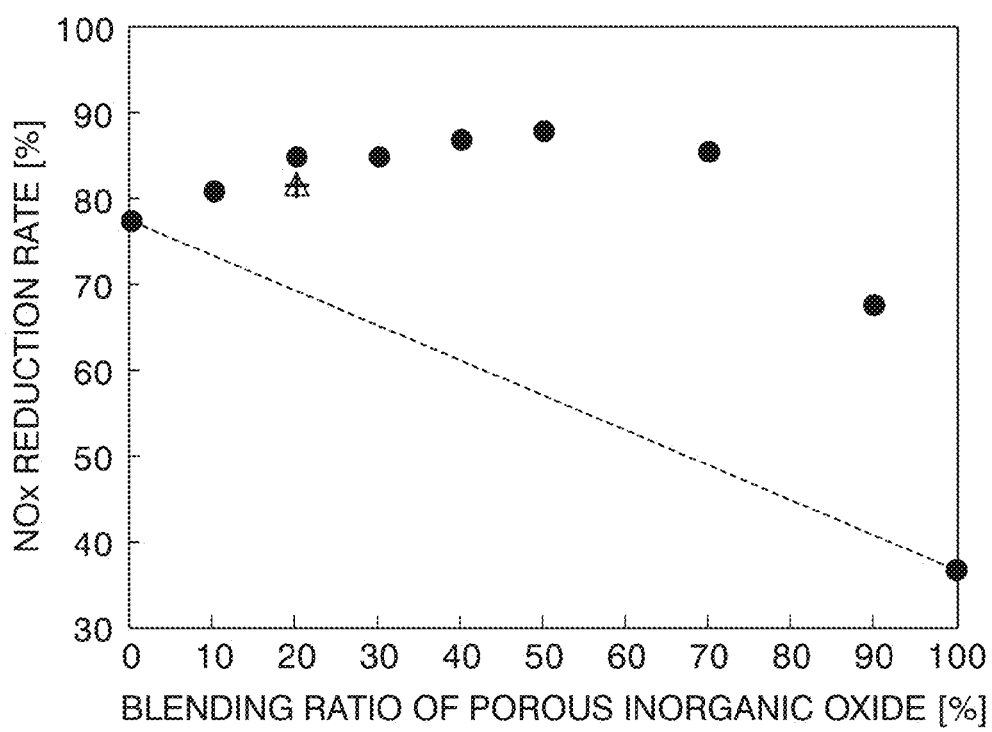
FIG. 6 shows the relation between the blending ratio of the β-type zeolite, the γ-alumina, or the ZSM-5 type zeolite in the compositions obtained in Examples 1 to 3, and the nitrogen oxide reduction rate in a durability treated state at 500° C.

The relation between the blending ratio of the β-type zeolite constituting the composition of Example 1 and the nitrogen oxide reduction rate in a durability treated state at 500° C. is shown in FIG. 6. The nitrogen oxide reduction rate of the composition of Example 1 was increased along with the increase of the blending ratio of the β-type zeolite.

The relation between the blending ratio of the γ-alumina constituting the composition of Example 2 and the nitrogen oxide reduction rate in a durability treated state at 500° C. is shown in FIG. 6. The composition of Example 2 showed a similar nitrogen oxide reduction rate to that of the composition of Example 1 having the same blending ratio (20% by weight).

The relation between the blending ratio of the ZSM-5 type zeolite constituting the composition of Example 3 and the nitrogen oxide reduction rate in a durability treated state at 500° C. is shown in FIG. 6. The composition of Example 3 showed a similar nitrogen oxide reduction rate to that of the composition of Example 1 having the same blending ratio (20% by weight).

INDUSTRIAL APPLICABILITY

The composition of the present invention is usable as, for example, a nitrogen oxide-reducing catalyst, and is applicable to the purification of exhaust gases from automobiles, and the like.

BRIEF DESCRIPTION OF THE REFERENCE SYMBOLS

The reference symbols used in the graphs have the following meanings.

Open square: nitrogen oxide reduction rate of the composition of Example 1 in a fresh state at 200° C.

Solid diamond: nitrogen oxide reduction rate of the composition of Example 2 in a fresh state at 200° C.
Multiplication sign: nitrogen oxide reduction rate of the composition of Example 3 in a fresh state at 200° C.
Solid square: nitrogen oxide reduction rate of the composition of Example 1 in a fresh state at 500° C.
Open diamond: nitrogen oxide reduction rate of the composition of Example 2 in a fresh state at 500° C.
Minus sign: nitrogen oxide reduction rate of the composition of Example 3 in a fresh state at 500° C.
Open circle: nitrogen oxide reduction rate of the composition of Example 1 in a durability treated state at 200° C.
Solid triangle: nitrogen oxide reduction rate of the composition of Example 2 in a durability treated state at 200° C.
Asterisk: nitrogen oxide reduction rate of the composition of Example 3 in a durability treated state at 200° C.
Solid circle: nitrogen oxide reduction rate of the composition of Example 1 in a durability treated state at 500° C.
Open triangle: nitrogen oxide reduction rate of the composition of Example 2 in a durability treated state at 500° C.
Plus sign: nitrogen oxide reduction rate of the composition of Example 3 in a durability treated state at 500° C.
Dotted line: showing a linear relation between the β-type zeolite content and the nitrogen oxide reduction rate, obtained on the basis of the nitrogen oxide reduction rates of each of the β-type iron silicate and β-type zeolite alone

The invention claimed is:

1. A composition comprising (i) a β-type iron silicate, which comprises all or part of iron in a β-type framework structure mixed with (ii) a solid acidic porous inorganic oxide.

2. The composition according to claim 1, wherein
a fluorine content relative to a dry weight of (i) the β-type iron silicate is 400 ppm or less, and
crystal grains of (i) the β-type iron silicate have a truncated square bipyramidal morphology.

3. The composition according to claim 1, wherein
a $SiO_2/Al_2O_3$ molar ratio of (i) the β-type iron silicate is 300 or more, and
an iron content relative to a dry weight of (i) the β-type iron silicate is 5.5% by weight or more and 12% by weight or less.

4. The composition according to claim 1, wherein (ii) the porous inorganic oxide is at least one type of porous inorganic oxide selected from the group consisting of a zeolite, an alumina, and a silica-alumina compound or a composite oxide.

5. The composition according to claim 4, wherein the zeolite has at least one type of crystalline structure selected from the group consisting of *BEA, FAU, MOR, MFI, FER, LTL, MWW, MTW, CHA, LEV, and SZR.

6. The composition according to claim 5, wherein the zeolite is an H-type zeolite.

7. A nitrogen oxide-reducing catalyst comprising the composition according to claim 1.

8. A method of reducing nitrogen oxides, comprising selectively reducing a nitrogen oxide by contacting the nitrogen oxide with at least one type of reducing agent selected from the group consisting of ammonia, urea, and an organic amine, under the presence of the nitrogen oxide-reducing catalyst according to claim 7.

* * * * *